(12) United States Patent
Brown

(10) Patent No.: US 9,973,421 B2
(45) Date of Patent: May 15, 2018

(54) METHOD AND DEVICE FOR CONNECTION MANAGEMENT IN A TELECOMMUNICATION NETWORK

(75) Inventor: Patrick Brown, Cagnes sur Mer (FR)

(73) Assignee: Orange, Paris (FR)

( * ) Notice: Subject to any disclaimer, the term of this patent is extended or adjusted under 35 U.S.C. 154(b) by 651 days.

(21) Appl. No.: 12/521,153

(22) PCT Filed: Dec. 18, 2007

(86) PCT No.: PCT/FR2007/052544
§ 371 (c)(1),
(2), (4) Date: Aug. 18, 2009

(87) PCT Pub. No.: WO2008/081146
PCT Pub. Date: Jul. 10, 2008

(65) Prior Publication Data
US 2010/0030885 A1   Feb. 4, 2010

(30) Foreign Application Priority Data

Dec. 29, 2006   (FR) ...................................... 06 56041

(51) Int. Cl.
| | |
|---|---|
| *H04L 12/741* | (2013.01) |
| *H04L 29/08* | (2006.01) |
| *H04L 29/06* | (2006.01) |
| *H04L 12/935* | (2013.01) |

(52) U.S. Cl.
CPC ............. *H04L 45/54* (2013.01); *H04L 69/22* (2013.01); *H04L 69/32* (2013.01); *H04L 49/3009* (2013.01)

(58) Field of Classification Search
CPC .......... H04L 45/54; H04L 69/22; H04L 69/32
USPC ........................................................ 709/223
See application file for complete search history.

(56) References Cited

U.S. PATENT DOCUMENTS

| | | | | |
|---|---|---|---|---|
| 5,937,002 | A  * | 8/1999  | Andersson et al. .......... 375/131 |
| 6,046,983 | A  * | 4/2000  | Hasegawa ........... H04L 12/5601 370/236.1 |
| 6,151,321 | A  * | 11/2000 | Benson et al. ........... 370/395.42 |
| 6,298,081 | B1 * | 10/2001 | Almgren et al. ............. 375/132 |
| 6,693,892 | B1 * | 2/2004  | Rinne ............... H04W 72/0446 370/329 |
| 6,928,054 | B1 * | 8/2005  | Montuno ................ H04L 29/06 370/235 |
| 7,010,108 | B2 * | 3/2006  | DelHoyo et al. ........ 379/202.01 |
| 7,130,305 | B2 * | 10/2006 | Kuukankorpi et al. ...... 370/392 |

(Continued)

*Primary Examiner* — Minh Chau Nguyen
(74) *Attorney, Agent, or Firm* — Drinker Biddle & Reath LLP

(57) ABSTRACT

The invention relates to connection management in a telecommunication network and particularly relates to a method (30) for managing telecommunication network connections, comprising a step of creating at least one list ($L_1, L_2, \ldots, L_N, L_{N+1}$) of connections, said list being associated to a time interval ($D_{L1}, D_{L2}, \ldots, D_{LN}, D_{LN+1}$) having a predetermined period and used to record at least one active connection (C1), for example, for which a transfer of a packet has been detected, in the time interval associated to the considered list.

20 Claims, 3 Drawing Sheets

(56) References Cited

U.S. PATENT DOCUMENTS

| | | | |
|---|---|---|---|
| 7,164,912 B2* | 1/2007 | Buckley et al. | 455/435.2 |
| 7,200,396 B2* | 4/2007 | Kauppinen | 370/390 |
| 7,225,258 B2* | 5/2007 | Orcutt et al. | 709/226 |
| 7,304,945 B1* | 12/2007 | Vishnu | 370/230 |
| 7,346,372 B2* | 3/2008 | Nagano et al. | 455/561 |
| 7,493,398 B2* | 2/2009 | Bush | 709/227 |
| 7,536,406 B2* | 5/2009 | Haselden et al. | 707/999.1 |
| 7,751,437 B2* | 7/2010 | Spinar et al. | 370/468 |
| 7,788,369 B2* | 8/2010 | McAllen et al. | 709/224 |
| 2002/0064149 A1* | 5/2002 | Elliott et al. | 370/352 |
| 2003/0002494 A1* | 1/2003 | Kuukankorpi et al. | 370/386 |
| 2003/0058869 A1* | 3/2003 | Novick | 370/395.43 |
| 2003/0179773 A1* | 9/2003 | Mocek et al. | 370/468 |
| 2004/0049563 A1* | 3/2004 | Orcutt et al. | 709/223 |
| 2004/0258072 A1* | 12/2004 | Deforche | 370/395.4 |
| 2005/0114714 A1* | 5/2005 | Albulet | 713/300 |
| 2005/0136937 A1* | 6/2005 | Qian et al. | 455/452.2 |
| 2005/0260988 A1* | 11/2005 | Kauppinen | 455/435.3 |
| 2006/0190563 A1* | 8/2006 | Vann | 709/219 |

\* cited by examiner

METHOD AND DEVICE FOR CONNECTION MANAGEMENT IN A TELECOMMUNICATION NETWORK

CROSS-REFERENCE TO RELATED APPLICATIONS

This application is the U.S. national phase of the International Patent Application No. PCT/FR2007/052544 filed Dec. 18, 2007, which claims the benefit of French Application No. 06 56041 filed Dec. 29, 2006, the entire content of which is incorporated herein by reference.

FIELD OF THE INVENTION

The present invention relates to the management of the connections of a telecommunications network.

BACKGROUND OF THE INVENTION

The connections are generally cataloged at the level of the nodes of the network, for example of the routing equipment of this network. The state of each connection is liable to be modified at the level of a node of the network when the latter detects a transit of a data packet belonging to this connection, that is to say it sends or receives a data packet.

A method for managing connections of a telecommunications network in which the ongoing connections are cataloged in a list is known in the prior art. The method comprises, for each connection, a test step for determining whether the connection has terminated. This step consists in comparing the duration elapsed since a date of detection of a transit of a packet belonging to this connection with a threshold value. If the duration is greater than the threshold value, the method comprises a step of deleting the connection from the list.

Such a method can be configured to periodically run through the list of all the connections and apply the test step to each connection of the list. It can also comprise, as soon as a packet transit is detected, a step of ranking the connections of the list as a function of their age, that is to say, for each connection, the duration elapsed since the last date of detection of a packet transit, and apply the test step periodically solely to the connection for which the age is the greatest.

Such a method is satisfactory when the number of connections to be managed is limited. Nevertheless, in the case of periodically running through the list, the time for processing the list increases linearly with the number of connections of the list, and, in the case of the ranking of the list after each detection, the processing time increases in a logarithmic manner as a function of the number of connections and in a linear manner as a function of the number of detected packets.

This method therefore rapidly exhibits implementation problems when it is employed on a large scale, in particular on networks in which the status of thousands of connections may be modified in a second. In order for the management of the connections of a list of this type of network to be performed in real time, it is in fact necessary for the frequency of processing of a connection of the list to be very high, thereby involving the use of very powerful and therefore expensive calculation means.

SUMMARY OF THE INVENTION

According to the invention, there is proposed a method for managing connections that can be employed on a large scale at a reasonable cost.

According to the invention, there is provided a method for managing connections of a telecommunications network comprising a step of creating at least one list, a said list being associated with a time interval of predetermined duration and intended to catalog at least one connection for which at least one packet has been detected in the time interval associated with the list considered.

Thus, the connections cataloged in the or each list are also associated with a time interval, which is determined during list creation. By then choosing the connections to be cataloged in the list according to a criterion relating to the activity of these connections (for example according to a date of detection of a transit of a packet belonging to this connection), the method according to the invention makes it possible to rank the connections in various lists and to associate them with a significant time interval for the or each connection. It is therefore possible to make an analogy between the lists created by the method according to the invention and geological layers, each list corresponding to a given "epoch". The connections corresponding to one and the same "epoch" can be considered globally and the processing of the connections is then no longer individual: the connections cataloged in one and the same list can be processed by processing the list, thereby making it possible to manage the connections just as effectively as in the prior art, while employing a smaller number of operations. The method for managing connections according to the invention is therefore able to be employed in larger scale systems with one and the same hardware and allows less expensive management of connections.

In a first embodiment of the invention, the creation step is implemented when the end of a time interval associated with a list created previously is detected.

Thus, in this embodiment, a new list is automatically created when the time interval associated with an existing list has terminated. All the possible dates are then taken into account once, thereby making it possible in a simple manner to be certain that no error is generated.

In a second embodiment, the creation step is implemented when a transit of a packet of a connection at a date not belonging to any time interval associated with one or more lists previously created is detected.

The date of detection of a transit of a packet is then the criterion taken into account to catalog the connection in a given list. In this embodiment, when a packet is detected and cannot be cataloged in any existing list, a list is created automatically. This makes it possible to avoid needless list creation operations when no packet passes through the network during a non-negligible time interval. The method is therefore more efficacious since it executes fewer operations for equally good management of the connections.

Advantageously, the method comprises a step of adding a connection to the list or to that of the lists associated with a time interval in which there falls a date of detection of a transit of a packet belonging to the connection.

In this way, it is very simple to manage the ranking of the connections in the respective lists.

The connection for which a packet has been detected is called a current connection hereinafter.

Optionally, the method comprises, when the current connection is cataloged in a second list, different from the list to which the current connection has been added, a step of deleting the current connection from the second list.

A given connection is in this case cataloged at any instant in a single list, even if the list cataloguing the current connection changes in the course of time. This makes it possible to reduce the volume of data to be managed.

The method according to the invention preferably comprises a step of recording a date associated with a connection, the associated date corresponding to a date at which a transit of a packet belonging to the connection concerned has been detected.

As a supplement, the method according to the invention can also comprise a test step for determining whether an elapsed duration between a date associated with the current connection and a date of detection of a packet belonging to the current connection is greater than a threshold value. If appropriate, one at least of the addition and deletion steps is implemented for the current connection.

The threshold value is preferably chosen in such a way that a connection cataloged in a list from a duration just less than the threshold value is not liable to be placed in an "old" list, that is to say in which the connection is liable to be deleted. If two transits of packets are detected at close dates, the connection will be processed only following the first transit. During the second transit, the connection is considered to be recent enough for its status not to have to be modified (it is in particular recent enough not to be considered to have terminated) and is therefore not processed. Thus, in this case, for one and the same number of detected transits, the method according to the invention comprises a more limited number of operations.

In a particular embodiment, following the detection of a packet, a step of deleting at least one connection of a list created prior to a predetermined number of lists is implemented, on condition that the deleted connection is different from the connection for which a packet has been detected.

Thus, when a new connection is added to one of the lists, it is possible to delete another connection, assumed to have terminated simply through the fact that it occurs in an old list, that is to say one created before numerous other lists. The deletion of the terminated connections can therefore be smoothed over time, so as to use the resources of a node in a controlled manner.

Optionally, the creation step is implemented so as to create at least two lists, the method comprising a step of deleting one of the lists, preferably a list created prior to a predetermined number of lists.

It is therefore possible to erase the connections globally, by deleting the list considered to be old or to be the oldest. Numerous tests to be performed regularly on the connections are therefore avoided. Furthermore, in conventional telecommunication networks, it is known that most connections are of very brief duration, or indeed are limited to one packet transit. Thus, this method of management makes it possible to perform only an operation specific to these connections (the creation step) and therefore to considerably decrease the number of operations envisaged for management.

In a particular embodiment, the deletion and creation steps are implemented in a concomitant manner.

Thus, a list is deleted only if another list needs to be created, making it necessary to delete this list, for example for storage volume reasons. This also makes it possible to economize on the implementation of operations and to improve the management performance in particular in a large scale network.

The subject of the invention is also a device for managing connections of a telecommunications network, comprising means for creating at least one list, a said list being associated with a time interval of predetermined duration and intended to catalog at least one connection for which at least one packet has been detected in the time interval associated with the list considered. The advantages stated for the method according to the invention are transposable to the device according to the invention.

According to the invention, there is also provided a computer program for managing connections of a telecommunications network, characterized in that the program comprises software instructions for creating a list able to catalog at least one connection and associated with a time interval of predetermined duration.

According to the invention, there is also provided an information medium comprising a list for managing connections of a telecommunications network, the list being able to catalog at least one connection and associated with a time interval of predetermined duration.

According to the invention there is also provided a data medium characterized in that it contains a computer program according to the invention.

BRIEF DESCRIPTION OF THE DRAWINGS

The invention will be better understood on reading the description which follows, given solely by way of example and while referring to the drawings in which.

DETAILED DESCRIPTION

Figure 1:
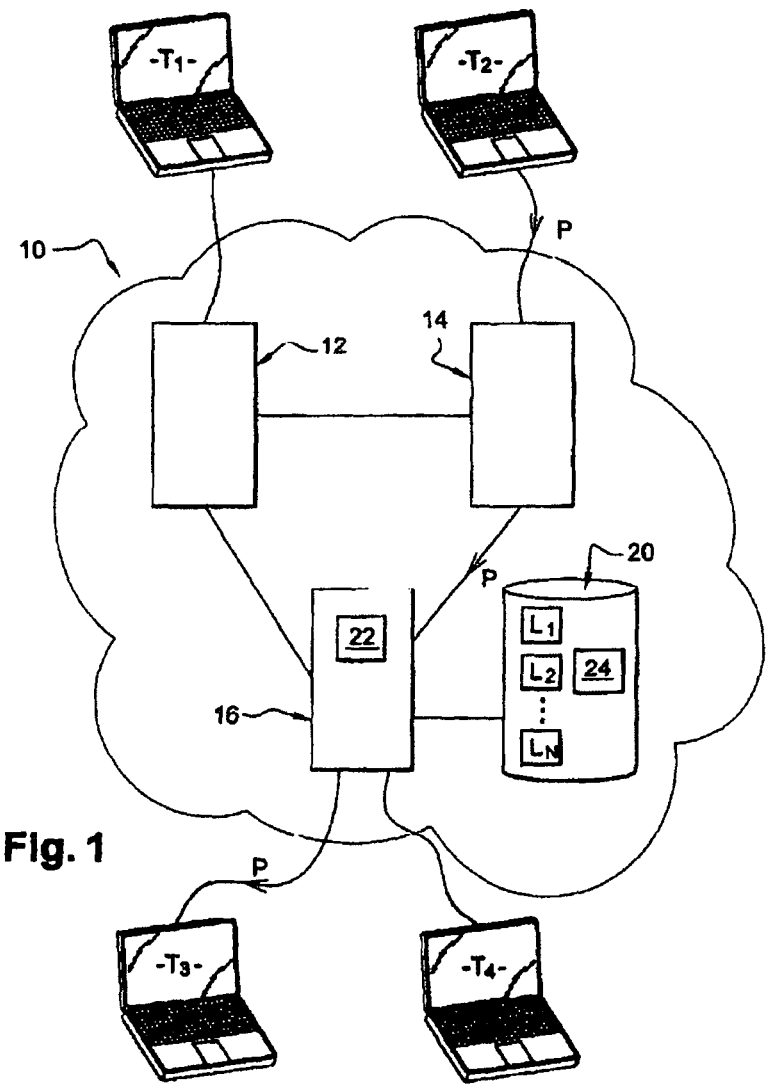
FIG. 1 represents a telecommunication network comprising a device for managing connections according to the invention.

Represented in FIG. 1 is a telecommunications network 10, for example a network of Internet, GPRS type (the acronym standing for Global Packet Radio Service), etc., comprising four terminals $T_1$, $T_2$, $T_3$ and $T_4$, as well as routing equipment 12, 14 and 16. The routing equipment form nodes of this network 10, through which packets pass (here a transit of a packet P is represented between the terminals $T_2$ and $T_3$ by way of the equipment 14 and 16).

In this network, node 16 comprises a device for managing connections. This device 16 comprises data storage means 20, such as a volatile memory of the EEPROM type. The data storage means 20 may be used to implement an information medium and a data medium. These storage means comprise N lists $L_1, L_2, \ldots, L_N$ for managing connections, each able to catalog at least one connection (including a connection $C_1$ to which the packet P passing through node 16 belongs) and also each associated with a respective time interval $D_{L1}, D_{L2}, \ldots, D_{LN}$ of predetermined duration. These storage means 20 also store a computer program 21 comprising software instructions for managing the connections. The expression "computer program" may be understood to mean several interacting modules.

A general list is recorded on a data medium, in the form for example of an array, each row of this array corresponding to a connection. The array comprises three columns:

a column serving to store an identifier of each connection of the general list, another column for a date associated with each connection of the list, the date associated with a connection corresponding to the date of detection of a packet belonging to this connection, a third column giving the list to which the connection belongs.

Each list $L_1$ is itself recorded on a data medium, in the form for example of an array, each row of this array corresponding to a connection. The array comprises two columns:

- a column serving to store an identifier of each connection of the list,
- another column serving to store a memory address or an item of information making it possible to retrieve a memory address, at which address information relating to the connection concerned is recorded.

The item of information making it possible to retrieve a memory address is for example a pointer to a memory area or an index relating to an array stored in memory. Any other item of information on the basis of which it is possible to retrieve the memory location of the information relating to the connection is of course usable. The subsequent description will be limited to the case where it is the memory address which is used.

Furthermore, in association with each list $L_i$ is stored a date of creation of this list. The date of creation of a list is chosen as the actual date at which the list was created or as the date defining the start of the time interval $D_{Li}$ associated with this list.

The device 16 also comprises calculation means 22, such as a processor, allowing the execution of the computer program 21.

Figure 2:
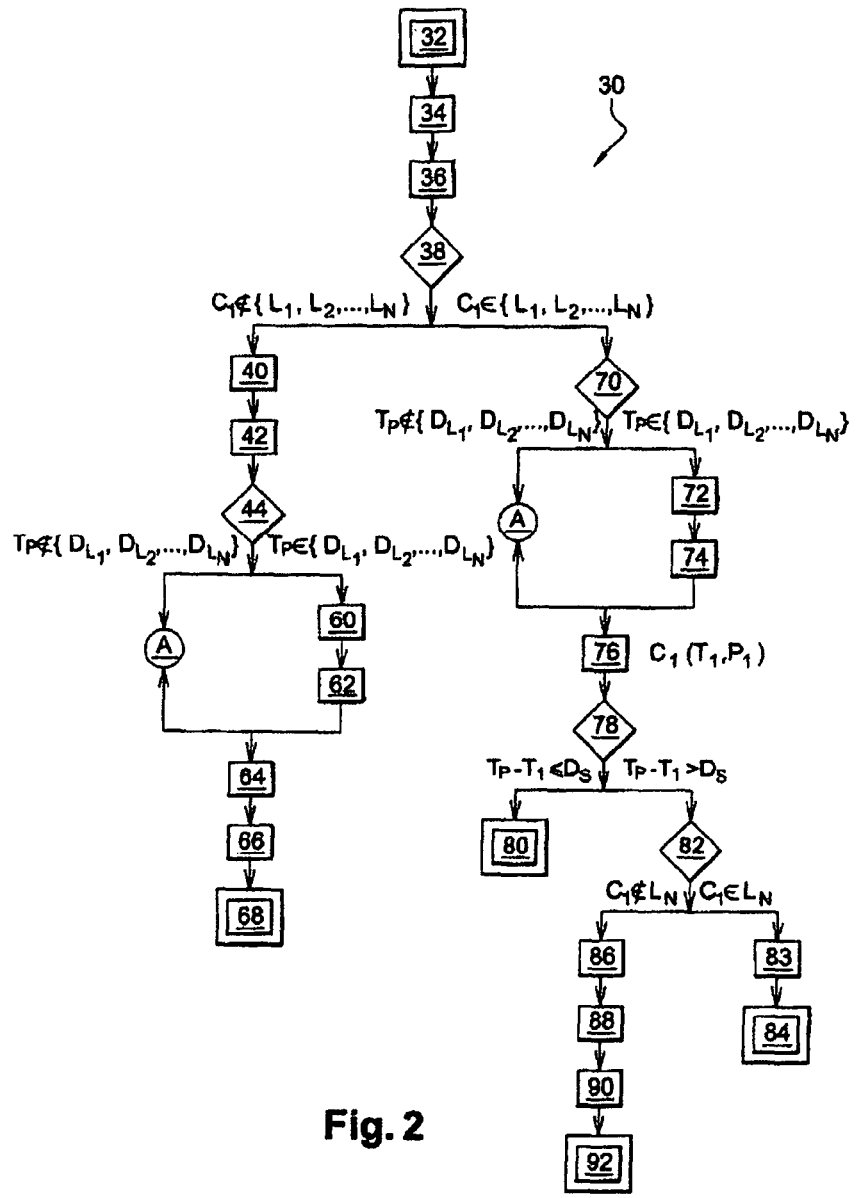
FIG. 2 represents the successive steps of a method for managing connections according to an embodiment of the invention, implemented by the management device of FIG. 1.
Figure 3:
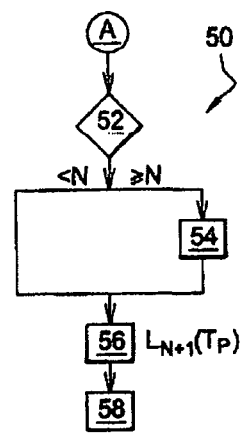
FIG. 3 illustrates a group of steps of the method for managing connections, represented in FIG. 2.

We shall now describe, with reference to FIGS. 2 and 3, a method for managing connections according to an embodiment of the invention, this method being for example implemented by the device 16.

The connections management method 30 represented is executed in a recursive manner, each new execution of this method 30 being triggered by a step 32 of detecting a transit of a packet through the node 16 of the telecommunications network 10. The expression "transit" is understood to mean that the packet P is sent or received by the node 16. Within the framework of the invention, the detection of packets can be performed equally at the node 16 or at any point of the network.

Once the packet P has been detected, the method comprises a conventional step 34 of identifying a connection $C_i$ to which the packet P belongs. This step is performed by the connections management program 21, able to determine a connection identifier with the aid of information previously extracted from the header of the packet P, for example an identifier of a recipient terminal $T_3$ receiving or of a sender terminal $T_2$ sending the packet P. The connection $C_1$ identified, for which a packet has been detected, is called a "current connection" hereinafter.

The method thereafter comprises a step 36 of recording the date $T_p$, corresponding to the date of detection of the transit of the packet P through node 16.

This step is followed by a test step 38 for determining whether the connection is cataloged in one of the existing lists $L_1, L_2, \ldots, L_N$. This step is performed by the program 21 for managing connections which, by means of the general list, compares the identifier of the connection $C_1$ with the identifier of each connection cataloged in one of the lists $L_1, L_2, \ldots, L_N$.

Two cases arise, depending on whether the current connection $C_1$ is or is not cataloged in one of the lists $L_1, L_2, \ldots, L_N$.

I. $C_1$ is not cataloged in the various lists $L_1, L_2, \ldots, L_N$.

In this case, the program creates, during a step 40, a row in the general array, which row is intended to catalog the connection $C_1$ and comprises in particular the identifier of the connection $C_1$. The program 21 also records, during step 42, the date of detection $T_p$ of the transit of the packet P in the guise of date $T_1$ associated with the connection $C_1$. The following steps will make it possible to determine a membership list for the connection $C_1$.

The method thereafter comprises a test step 44 for determining whether the date associated with the connection $C_1$, that is to say the date of detection $T_p$, falls in a time interval $D_{L1}, D_{L2}, \ldots D_{LN}$ associated with one of the existing lists $L_1, L_2, \ldots, L_N$.

A. $T_p$ does not fall in a time interval $D_{L1}, D_{L2} \ldots, D_{LN}$.

The method 30, illustrated in FIG. 2, then comprises a subgroup, represented in FIG. 3, of steps 50 comprising steps 52 to 58.

This subgroup of steps comprises a first test step 52 for determining whether the total number of lists is greater than or equal to a predetermined integer number $N_{max}$.

1. The number N of lists is greater than or equal to $N_{max}$.

In this case, the method comprises a step 54 of deleting a list created prior to a predetermined number $N_{max}$ of lists. To perform this step, the program 21 for managing connections compares dates of creation of each of the lists $L_1, \ldots, L_N$ recorded in the storage means 20 of the device and determines the list or lists liable to be deleted. It thereafter chooses a list in a random manner, if several lists are concerned, then performs the deletion of the chosen list. The program can for example be configured so that the deleted list is the oldest list ($L_1$). Following step 54, step 56 described below is executed.

2. The number of lists is less than $N_{max}$.

In this case, step 56 is executed directly.

Step 56, also performed subsequent to step 54 or following step 52, is a step of creating a new list $L_{N+1}$ recorded as created at the date $T_p$. This list is associated with a time interval of predetermined duration, this time interval starting at the date of creation of the list $T_p$.

The method thereafter comprises a step 58 of ranking the various lists as a function of their creation date, so as to be able to more rapidly identify the oldest lists and, therefore, to facilitate the step of deleting the list.

B. $T_p$ falls in one of the time intervals $D_{L1}, D_{L2} \ldots, D_{LN}$.

When, as is represented in FIG. 2, it is determined, following step 44, that the date of detection $T_p$ of the transit of the packet through node 16 falls in one of the time intervals $D_{L1}, D_{L2} \ldots, D_{LN}$ associated with one of the existing lists $L_1, L_2, \ldots, L_N$, the method comprises a step 60 of choosing connections that are cataloged in one of the lists created prior to a predetermined number of lists, for example the list $L_1$, which is the oldest of the lists created.

Step 60 is followed by a step 62 of deleting the chosen connections. The choosing of the connections in the list $L_1$ can be performed in a random manner or according to the date of this connection by the program 21. These operations 60, 62 are performed so as to make it possible to curtail a step of deleting the list created prior to a determined number of lists, which will be performed subsequently, since the simultaneous deletion of all the connections of the list $L_1$ could give rise to excessive use of the resources of node 16.

Thus, in the embodiment represented, the list in which the connections are erased and the list deleted by priority (here $L_1$) when the end of the time intervals associated with the lists is detected, are identical.

The method comprises, following step 58 or 62, a step 64 of adding the connection $C_1$ to the list associated with the time interval in which the date of detection $T_p$ falls. In the case where the list was created following the detection of the transit of the packet P (case A), the connection $C_1$ is added to the newly created list $L_{N+1}$. In the case where the creation of a list was not necessary (case B), the connection $C_1$ is recorded in the last list created ($L_N$), which is the only list for which the end of the time interval has not been detected.

This method is obviously constructed so that one and the same date of detection does not fall in two distinct time intervals associated with two different lists since a list is created solely when a connection cannot be cataloged in the existing lists. There is therefore no overlap between the intervals associated with the various lists $L_1, L_2, \ldots, L_N$.

During step 64, the memory address of the data relating to the connection $C_1$ is returned to the program 21 and the latter updates, during a step 66, the memory address associated with the connection $C_1$, so as to be able to easily retrieve information relating to the connection $C_1$ if a transit of a new packet associated with this connection is detected by node 16.

The method thereafter comprises a standby step 68, during which no operation is performed. That phase of the method related to the detection of the packet P has terminated but the method resumes in step 32 from the detection of a transit of a new packet.

II. $C_1$ is cataloged in a list $L_1, \ldots, L_N$.

The method comprises in this case a test step 70 for verifying whether the date $T_p$ of detection of the packet falls in one of the time intervals $D_{L1}, D_{L2} \ldots D_{LN}$ associated with the lists $L_1, L_2, \ldots, L_N$. This step is analogous to step 44.

A. $T_p$ does not fall in a time interval $D_{L1}, \ldots D_{LN}$.

The program 21 then implements the group of steps 50 (steps 52 to 58 described above).

B. $T_p$ does fall in one of the time intervals $D_{L1}, D_{L2}, \ldots D_{LN}$.

If the date of detection $T_P$ belongs to a time interval associated with one of the existing lists $L_1, L_2, \ldots L_N$, the method comprises steps 72, 74 of choosing connections not possessing the same connection identifier as the connection $C_1$ to which the detected packet P belongs, and of deleting these connections. These steps 72, 74 are analogous to steps 60, 62.

The method comprises, following step 58 or 74, a step 76 of reading in the general array the date $T_1$ associated with the current connection $C_1$ to which the detected packet belongs and a memory address $E_1$ associated with the connection $C_1$.

The method thereafter comprises a test step 78 for determining whether an elapsed duration between the date of detection $T_P$ of the packet P and the date $T_1$ associated with the connection $C_1$ is greater than a threshold value $D_s$.

$1^{st}$ case, $T_P - T_1 = < D_s$

The method comprises in this case a standby step 80, analogous to step 68, and the method phase related to the detection of the transit of the packet P has terminated. This step makes it possible for packets detected at close dates not to have to be processed several times, though without running the risk of the connection associated with these packets being deleted, the threshold duration $D_s$ being judiciously chosen to prevent the connection from being in one of the lists created prior to a predetermined number of lists $L_1, L_2, \ldots L_N$. The number of updates to be performed is thereby limited.

$2^{nd}$ case, $T_P - T_1 > D_s$

If the elapsed duration is conversely greater than the threshold value, the method comprises a test step 82 for determining in which list $L_1, L_2, \ldots L_N$ the connection $C_1$ is cataloged at the date of detection of the packet. For this purpose, the program 21 interrogates either the general array, or each of the lists $L_1, L_2, \ldots L_N$ so as to determine whether it contains a connection associated with the memory address $E_1$.

1. $C_1$ belongs to the most recent list.

If, following this step, the program 21 determines that the connection $C_1$ belongs to the list created most recently and associated with a time interval whose end has not been detected (that is to say, the list $L_N$ or $L_{N+1}$ according to the result of the test step 70), the method comprises a step 83 of updating the date $T_1$ associated with the connection $C_1$, this new associated date being the date $T_p$ of detection. Step 83 is followed by a standby step 84, identical to steps 68 and 80.

2. $C_1$ does not belong to the most recent list.

On the other hand, if the connection $C_1$ does not belong to the list $L_N$ or $L_{N+1}$, the method comprises a step 86 of deleting the connection $C_1$ from the list in which it is cataloged. This step is followed by a step 88 of adding the connection $C_1$ to the list $L_N$ created most recently, identical to step 64. The method thereafter comprises a step 90 of updating the date $T_1$ associated with the connection $C_1$, this new associated date being the date $T_p$ of detection and of update of the memory address associated with the connection, this step being identical to step 66 described previously. This step is followed by a standby step 92 identical to steps 68, 80 and 84.

Different variants of the method are conceivable.

According to a first variant, the steps representing the creation of a new list $L_{N+1}$ can be executed independently of the detection of a packet, in particular automatically when the program 21 detects the end of the time interval associated with another list $L_N$. In this case, the tests 44 and 70 as well as the group of steps 52 to 58 or 60 to 62 are no longer implemented when a new packet is detected. In this variant, the date $T_p$ of detection of the packet P necessarily belongs to the time interval of one of the lists, in this instance, to the time interval of the current list. The group of steps 64 to 68 is thus executed following step 44, when the connection $C_1$, to which the detected packet belongs, is not cataloged in an existing list. The group of steps 76 to 92 is for its part executed following step 70, when the connection $C_1$ to which the detected packet belongs is already cataloged in an existing list.

Furthermore, the test step 78 is an optional step, as is the test step 82, these steps merely making it possible to further curtail the amount of processing to be performed in the various lists and not in any case being necessary for the execution of the method described previously.

Steps 60, 62, 72 and 74 are also optional, it being possible for a list to be deleted in one go with all the connections that it comprises.

Another variant consists, when the connection to which a packet belongs is already cataloged in one of the lists, in testing whether the difference $T_P - T_1$ is less than $D_s$, and if it is, in not performing any other processing nor updating of a list. The effect of this is to limit the number of processing operations to be performed per unit time for the implementation of the method according to the invention.

The method according to the invention allows the management of connections on a large scale and at low cost with reduced calculation power since the number of steps for processing packets and connections is limited.

The method consists in managing and updating only the active connections, that is to say those for which packets are detected, the inactive connections not being managed and regularly deleted by deleting old lists or old connections. Thus, only the connections of long duration form the subject of a processing consisting in updating an item of date information relating to these connections and/or in modifying the membership list for these connections. The percentage of long-duration connections being low (5 to 10% in general), this results in a reduction in the processing time and resources required. The process therefore allows effective sorting of the connections as a function of their age or their duration.

The invention claimed is:

1. A method for managing connections of a telecommunications network, comprising:
   creating, using a processor of a node of the network, a plurality of distinct connection lists each associated with one of a plurality of time intervals of predetermined durations, respectively;
   storing the plurality of connection lists in a memory that is accessible by the node;
   detecting a packet transiting through the node in a first time interval, the packet belonging to a first connection; and
   cataloguing said first connection to a first connection list that is associated with the first time interval in which said packet was detected.

2. The method as claimed in claim 1, wherein said cataloguing further comprises:
   creating the first connection list when an end of a time interval that is associated with one of the plurality of connection lists that was previously created is detected.

3. The method as claimed in claim 2, further comprising:
   deleting the first connection list.

4. The method as claimed in claim 3, wherein the step of deleting and the step of creating performed simultaneously.

5. The method as claimed in claim 3, wherein the first connection list was created prior to a predetermined number of lists.

6. The method as claimed in claim 1, wherein said cataloguing further comprises:
   adding the first connection as a current connection to the first connection list associated with the first time interval, the current connection including a date of detection of transition of the packet belonging to the current connection.

7. The method as claimed in claim 6, further comprising:
   deleting the current connection from a second connection list associated with a second time interval after the current connection is cataloged in a connection list that is different from the second connection list to which the current connection was added and is associated with a time interval different from the second time interval.

8. The method as claimed in claim 7, further comprising:
   recording a time associated with the current connection, the time corresponding to the time at which the transition of the packet belonging to the current connection has been detected.

9. The method as claimed in claim 6, further comprising:
   recording the time at which the transition of the packet belonging to the current connection has been detected.

10. The method as claimed in claim 9, further comprising:
    determining whether an elapsed duration between a time associated with the current connection and the time of detection of the packet belonging to the current connection is greater than a threshold value; and
    deleting the current connection from the first connection list after said step of determining has determined that the time is above the threshold value.

11. The method as claimed in claim 1, wherein said cataloguing further comprises:
    detecting whether a time of transition of the packet is within one of the plurality of time intervals; and
    creating the first connection list after said detecting confirms that the time of transition of the packet is not within the plurality of time intervals that are associated to the plurality of connection lists.

12. The method as claimed in claim 1, further comprising:
    deleting a connection of a connection list that was created prior to a predetermined number from the plurality of the connection lists, when the deleted connection is different from the connection for which the packet has been detected by said step of detecting.

13. A non-transitory data-storage medium including instructions that, when executed on a computer, cause the computer to perform a method of managing connections, the method comprising the steps of:
    creating, using a processor of a node of a network, a plurality of distinct connection lists each associated with one of a respective plurality of time intervals of predetermined durations, respectively, each of the lists intended to catalog at least one connection for which at least one packet has been detected in the time interval associated with the list;
    storing the plurality of connection lists in a memory that is accessible by the node;
    detecting a packet transiting through the node in a first time interval, the packet belonging to a first connection; and
    cataloguing said first connection to a first connection list that is associated with the first time interval in which said packet was detected.

14. The data-storage medium as claimed in claim 13, said method further comprising:
    creating the first connection list when an end of a time interval that is associated with one of the plurality of connection lists that was previously created is detected.

15. The data-storage medium as claimed in claim 13, said method further comprising:
    creating a first connection list when the transition of the packet of a connection at a time does not belong to any of the time intervals associated with the plurality of connection lists that were previously created is detected.

16. The data-storage medium as claimed in claim 13, said method further comprising:
    deleting a connection from a first connection list that was created prior to a predetermined number from the plurality of the connection lists, when the deleted connection is different from the connection for which the packet has been detected by said step of detecting.

17. A device for managing connections of a telecommunications network, comprising a hardware processor and a memory, the hardware processor configured to
    create a plurality of distinct connection lists each associated with one of a plurality of time intervals of predetermined durations, respectively;
    store the plurality of connection lists in the memory;
    detect a packet transiting through the device in a first time interval, the packet belonging to a first connection; and
    catalogue said first connection to a first connection list that is associated with the first time interval in which said packet was detected.

18. A method for managing connections of a telecommunications network, comprising:
    creating, using a processor of a node of the network, a plurality of distinct connection lists each associated with one of a plurality of time intervals of predetermined durations, respectively;
    storing the plurality of connection lists in a memory that is accessible by the node;

detecting a packet transiting through the node in a first time interval, the packet belonging to a first connection;

cataloguing said first connection to a first connection list that is associated with the first time interval in which said packet was detected, said cataloguing comprising:

detecting whether a time of transition of the packet is within one of the plurality of time intervals; and creating the first connection list after said detecting confirms that the time of transition of the packet is not within the plurality of time intervals that are associated to the plurality of connection lists.

19. A device for managing connections of a telecommunications network, comprising a hardware processor and a memory, the hardware processor configured to create a plurality of distinct connection lists each associated with one of a plurality of time intervals of predetermined durations, respectively;

store the plurality of connection lists in the memory;

detect a packet transiting through the device in a first time interval, the packet belonging to a first connection; and catalogue said first connection to a first connection list that is associated with the first time interval in which said packet was detected, the cataloguing comprising:

detecting whether a time of transition of the packet is within one of the plurality of time intervals; and creating the first connection list after said detecting confirms that the time of transition of the packet is not within the plurality of time intervals that are associated to the plurality of connection lists.

20. A non-transitory data-storage medium including instructions that, when executed on a computer, cause the computer to perform a method of managing connections, the method comprising the steps of:

creating, using a processor of a node of a network, a plurality of distinct connection lists each associated with one of a respective plurality of time intervals of predetermined durations, respectively, each of the lists intended to catalog at least one connection for which at least one packet has been detected in the time interval associated with the list;

storing the plurality of connection lists in a memory that is accessible by the node;

detecting a packet transiting through the node in a first time interval, the packet belonging to a first connection; and cataloguing said first connection to a first connection list that is associated with the first time interval in which said packet was detected, said cataloguing comprising:

detecting whether a time of transition of the packet is within one of the plurality of time intervals; and creating the first connection list after said detecting confirms that the time of transition of the packet is not within the plurality of time intervals that are associated to the plurality of connection lists.

* * * * *